Sept. 1, 1936.      F. A. MOSS ET AL      2,052,789
WABBLE METER
Filed June 22, 1931      2 Sheets-Sheet 1

INVENTORS
Frederick A. Moss
Hobart Cutler Dickinson
Roy W. Brown
BY Clinton S. Janes
ATTORNEY Sept. 1, 1936. F. A. MOSS ET AL 2,052,789
WABBLE METER
Filed June 22, 1931 2 Sheets-Sheet 2

INVENTORS
Frederick A. Moss
Hobert Cutler Dickinson
BY Roy W. Brown
Clinton S. Janes
ATTORNEY Patented Sept. 1, 1936

2,052,789

UNITED STATES PATENT OFFICE 2,052,789

WABBLE-METER

Frederick A. Moss, Clarendon, Va., Hobert Cutler Dickinson, Washington, D. C., and Roy W. Brown, Akron, Ohio Application June 22, 1931, Serial No. 546,070

10 Claims. (Cl. 35—22)

This invention relates to wabble meters and more particularly to an instrument for measuring and recording bodily unsteadiness. Instruments of this character have been found useful in obtaining quantitative data with respect particularly to nerve fatigue, since it has been established that the comparative ability to preserve one's balance is in general a satisfactory indication of the condition of the subject's nerve energy.

It is an object of the present invention to provide novel means for measuring the fatigue of the nervous system of a subject.

It is another object to provide novel apparatus of the class described, the principle of which is based on the relation between the fatigue of the nervous system and the physical steadiness or equilibrium of the subject, the theory being, as supported by exhaustive tests, that steadiness decreases as fatigue increases.

Another object of the invention is to provide a novel instrument for measuring and recording variations in bodily equilibrium.

A further object is to provide such a device which is reliable and efficient and can be readily standardized for purposes of comparative tests.

A still further object is to provide such a device in which the recording of the wabbles or variations is entirely automatic.

Another object is to provide such a device which automatically integrates the extent of departures from bodily equilibrium of a subject, and constantly furnishes a direct quantitative reading.

Another object is to provide such a device which indicates and records the departures from bodily equilibrium of a subject by converting them into pivotal movements forward and backward, and from side to side, and produces separate records of each type of movement.

A further object is to provide such a device which is small, comparatively light, and self-contained, requiring no extraneous equipment.

Another object is to provide such a device which is readily set up and used, is unaffected by variations in temperature or other conditions of use, and is entirely noiseless in operation whereby the attention of the subject is not called to the operation of the device.

Further objects and advantages will be apparent to those skilled in the art to which this invention pertains from the following description taken in connection with the accompanying drawings, in which—

Figure 1:
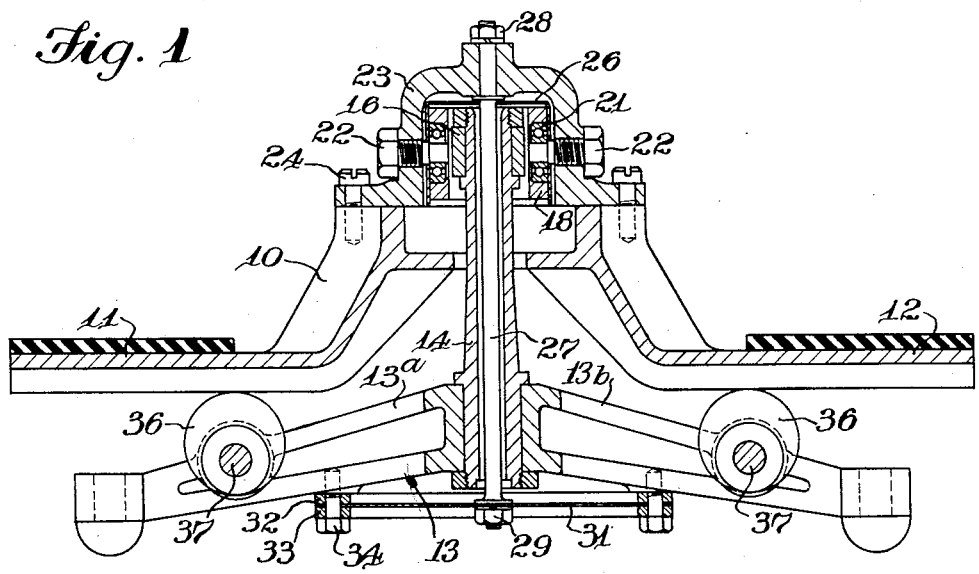
Fig. 1 is a vertical sectional view of a preferred form of the invention taken substantially on the line 1—1 of Fig. 3.

Referring first to Fig. 1 of the drawings, the device consists essentially of a platform member 10 having wings 11 and 12 on which the subject stands when the device is in use. The platform member 10 is supported for a limited universal movement on a base 13 having legs 13a, 13b, 13c and 13d. This universal support may be of any suitable character, and as shown consists of a hollow vertical column 14 centrally mounted in the base 13 and carrying at its upper end a universal joint comprising a block 16 mounted thereon and having aligned trunnions 17 projecting laterally therefrom, an intermediate gimbal ring or block 18 having antifriction bearings 19 for the trunnions 17 and a pair of antifriction bearings 21 arranged at right angles to the bearings 19 for the reception of aligned studs 22 rigidly mounted in a yoke member 23 fixed to the platform member 10 as by studs 24. The block 18 is preferably enclosed in a shield 26 enclosing the bearings and protecting the joints from foreign matter.

Means are provided for yieldably holding the yoke 23 in its normal upright position so that deflections of the platform member 10 from its horizontal position are resisted and the platform member is returned to its normal position when the deflecting force is removed. In the device shown, this yielding means comprises a vertical rod 27 traversing the vertical column 14 and suitably anchored at its upper end in the yoke 23 as indicated at 28. The lower end of the rod 27 is rigidly fixed as shown at 29 to the center of an elastic diaphragm 31 the rim of which is fixedly clamped to the underside of the base 13 by suitable means such as the rings 32 and 33 located above and below said diaphragm and tapped into the bottom of the base 13. It will thus be seen that any deflection of the rod 27 from the vertical will cause a deflection of the diaphragm 31. The diaphragm may be laminated if desired, and is made of material having sufficient stiffness to give the required amount of stability to the platform member 10 for the purpose in view.

Figure 3:
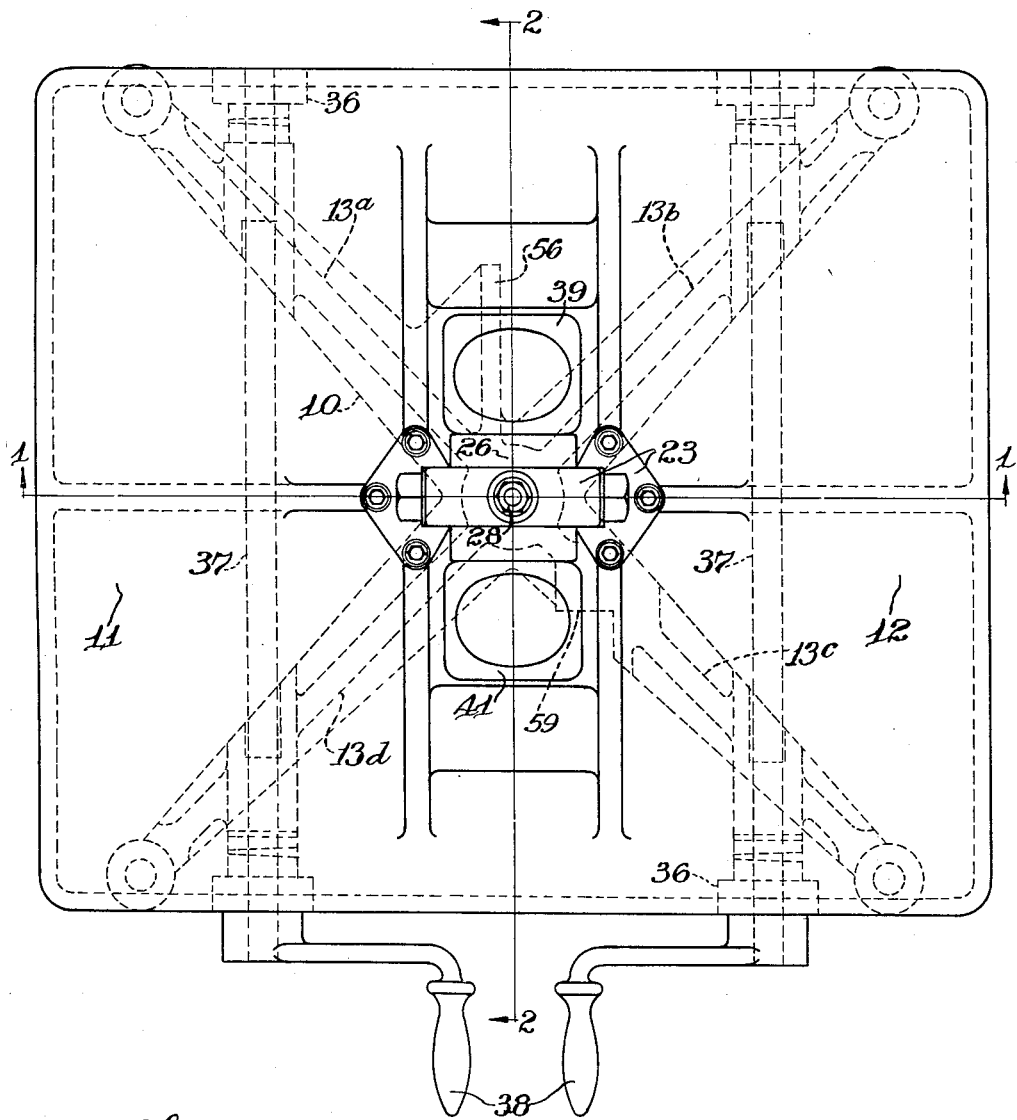
Fig. 3 is a top plan view of the device.

Means are provided for preventing angular movement of the platform 10 with respect to the base 13 when the subject is getting on or off the machine, which means may take the form as best shown in Figs. 1 and 3 of cam members 36 mounted on parallel shafts 37 and adapted to be rotated by cranks 38. The shafts 37 are journaled in the base 13 and the cams 36 are so located that when rotated into the upper position shown in Fig. 1, they bear against the bottom of the platform member 10 and support it directly from the base 13, while a half revolution of the shafts 37 by the cranks 38 will cause the cams to be rotated into inoperative position and allow the platform member 10 the desired amount of universal angular movement.

Figure 2:
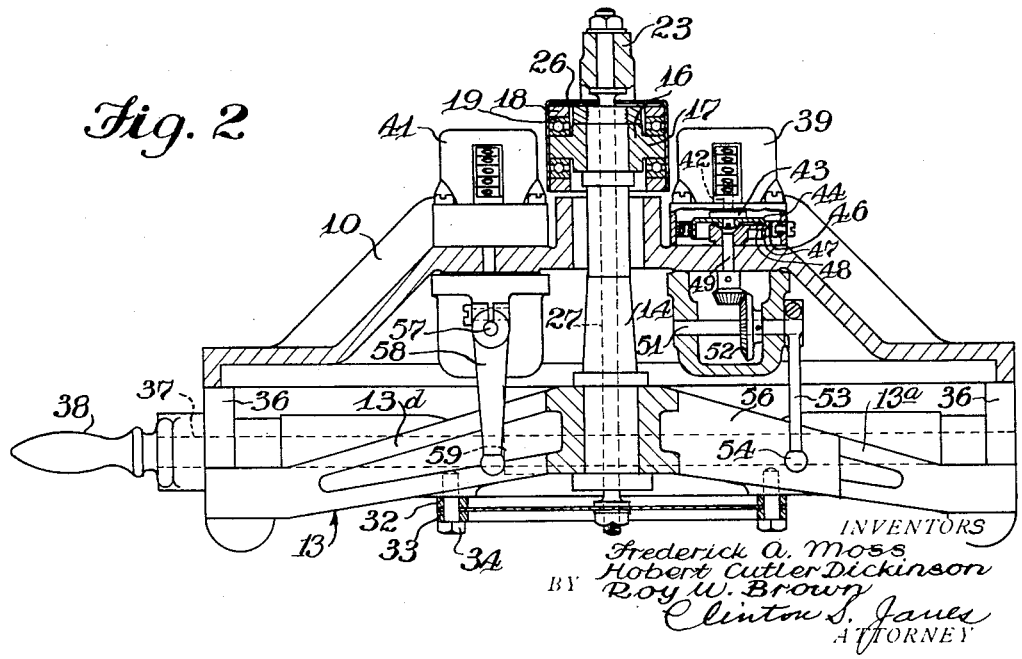
Fig. 2 is a vertical sectional view taken approximately on the line 2—2 of Fig. 3.

According to the present invention, the angular movements of the platform member 10 about the two horizontal axes defined by the studs 17 and the studs 22 respectively, are measured and recorded by separate automatic recording instruments. As best shown in Fig. 2, these instruments take the form of commercial counting devices 39 and 41 for recording movements about the axes of studs 17 and 22 respectively. The counting device 39 comprises a vertical operating shaft 42 which is driven from an overrunning clutch 43 from a cup-shaped member 44. This member is yieldably urged in a retrograde direction by means of a helical spring 46 and has an axial slit 47 in the edge thereof adapted to be engaged by an arm 48 on a driving shaft 49. The driving shaft 49 is actuated from a power shaft 51 through a bevel gear connection indicated at 52. An operating arm 53 is mounted on the end of the shaft 51 and is provided at its free end with a knob 54 arranged to bear against a vertical surface provided by a projection formed on the leg 13a (Fig. 3). When the device is assembled, the spring 46 is placed under initial tension whereby it urges the arm 53 into engagement with the plate 56 so that the knob 54 remains in engagement with said plate during angular movement of the platform member 10 about the axis of the studs 17, whereby such angular movement causes the arm 53 to oscillate with respect to the platform member 10, causing the cup member 44 to be rotated back and forth through angles depending on the amount of deflection of the platform member 10. Since the cup member 44 is connected to the shaft 42 of the counting mechanism through the overrunning clutch 43, it will be seen that the counting mechanism is operated forwardly by the angular movements of the platform member 10 and the reading of the counting mechanism will give an integration of such angular movements.

The counting mechanism 41 is operated in a similar manner to the counting mechanism 39 with the exception that the power shaft 57 thereof is located at right angles to the power shaft 51, and the operating arm 58 is actuated by a projection 59 provided on the leg 13c (Fig. 3).

In operation, the device is preferably placed on the floor, the handles 38 operated to rotate the cams to their upper position to lock the platform member 10, and the subject allowed to stand erect with one foot on each of the wings 11 and 12 of the platform member 10. The initial readings of the counters 39 and 41 are taken, the handles 38 are operated to lower the cams 36, and suitable timing mechanism such as a stop watch set in motion to measure a standard interval of time. It has been found that an interval of one minute is suitable for most purposes, and at the termination of such interval the handles 38 are operated to again lock the platform member 10 and the readings of the counting mechanisms are again taken. This operation will of course preferably be repeated several times in order to secure an average.

It will be understood of course that the stiffness of the diaphragm 31 is so chosen that the ordinary gravity forces exerted by the patient to maintain his equilibrium are within the strength of the diaphragm to resist so that such forces are measured by the amount of deflection of the platform 10 and are integrated by the counting devices.

Some of the uses to which this device is adapted are first, in the automotive field for testing the effect of the riding characteristics of various cars on the nerve energy of the subjects, thereby giving an indication of the riding qualities of the cars; secondly, in industries for measuring the fatigue of various types of work; thirdly, in psychological and physiological laboratories in research as to various effects on the nervous system of external stimuli such for instance as noise; fourthly, in amusement places where the device might be used in the nature of a vending machine either alone or in conjunction with a weighing machine to indicate the fatigue of persons using the same by providing a coin-controlled machine for unlocking the platform and for locking it after a predetermined length of time; fifthly, in hospitals for the analysis of the conditions of patients subject to neurological disturbances, and in testing the reactions of pilots of aeronautical machines.

Although but one form of the invention has been shown and described in detail, it will be understood that the invention is broader than this specific embodiment and that various changes and modifications, which will now appear to those skilled in the art, may be made without departing from the scope of the invention. For instance, hydraulic pumps might be located at the corners of the oscillating platform which pumps might force a liquid into a container, the amount of such displaced liquid measuring the total amount of vibration of the support, or a recording device might be used in which styli are adapted to record on a rotating cylinder the divergencies from normal position of the supporting platform about the two axes of support. Reference is, therefore, to be had to the appended claims for a definition of the limits of the invention.

What is claimed is:

1. In a device of the class described, a support, a platform pivoted on said support, on two axes at right angles to each other, and means for measuring the pivotal movement of said platform about each of said axes.

2. In a device of the class described, a relatively fixed support, a normally horizontal platform centrally pivoted on said support and adapted for pivotal movement in two directions simultaneously, and means for integrating and indicating such pivotal movement.

3. In a device of the class described, a relatively fixed support, a normally horizontal platform centrally pivoted on said support and adapted for pivotal movement in two directions simultaneously, means for integrating and indicating the pivotal movement in one direction, and similar means for integrating and indicating the pivotal movement in the other direction.

4. In a device of the class described, a relatively fixed support, a normally horizontal platform centrally pivoted on said support and adapted for pivotal movement in two directions simultaneously, means for indicating and progressively adding such pivotal movements, and means for locking the platform against such pivotal movement when desired.

5. An instrument for measuring the nerve fatigue of a subject by measuring the motions of an unstable platform as the subject tries to keep his balance thereon, comprising a platform for supporting the subject, a pendulous mounting for said platform and having its pivot below the center of gravity of the subject when the latter is standing on said platform, yielding means to resist angular deflections of said platform, and means to measure and integrate such angular deflections.

6. In an instrument for measuring the nerve fatigue of a subject by measuring the motions of an unstable platform as the subject tries to keep his balance thereon, a normally horizontal platform, a pivotal support for said platform, yielding means for resisting pivotal movement of said platform, and means for measuring and integrating the extent of such pivotal movements.

7. In an instrument for measuring the nerve fatigue of a subject by measuring the motions of an unstable platform as the subject tries to keep his balance thereon, a platform for supporting the subject in erect position, a pendulous mounting for said platform, yielding centering means for said platform, and means to measure and integrate the extent of angular deflections of said platform.

8. In an instrument for measuring the nerve fatigue of a subject by measuring the motions of an unstable platform as the subject tries to keep his balance thereon, a normally horizontal platform for supporting the subject, a pivotal support for said platform, yielding means for resisting pivotal movement of said platform, means for measuring and integrating the extent of movement produced by a number of such pivotal movements, and means for initially holding the platform in a steady position before measurements are taken.

9. In an instrument for measuring the nerve fatigue of a subject by measuring the motions of an unstable platform as the subject tries to keep his balance thereon, a platform for supporting the subject in erect position, a pendulous mounting for said platform, yielding centering means for said platform, means for measuring the angular deflections of said platform, and means for initially holding the platform in a steady position before measurements are taken.

10. In an instrument for measuring the nerve fatigue of a subject by measuring the motions of an unstable platform as the subject tries to keep his balance thereon, a relatively fixed support, a normally horizontal platform for supporting the subject thereon but adapted to move angularly relative to the support about two horizontal axes at right angles to each other, means for measuring and progressively adding the angular movements of the platform about both axes, and mechanism interposed between the support and the platform for actuating the measuring means.

FREDERICK A. MOSS.
HOBERT CUTLER DICKINSON.
ROY W. BROWN.